United States Patent
Michalakis (10) Patent No.: US 12,198,442 B2
(45) Date of Patent: Jan. 14, 2025

(54) SYSTEMS AND METHODS FOR PROVIDING UPDATABLE ROADWAY CODES

(71) Applicant: Toyota Research Institute, Inc., Los Altos, CA (US)

(72) Inventor: Nikolaos Michalakis, Saratoga, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 1187 days.

(21) Appl. No.: 15/455,647

(22) Filed: Mar. 10, 2017

(65) Prior Publication Data

US 2018/0260638 A1    Sep. 13, 2018

(51) Int. Cl.

| | |
|---|---|
| G06V 20/58 | (2022.01) |
| G06F 16/23 | (2019.01) |
| G06Q 30/0251 | (2023.01) |
| G06V 20/20 | (2022.01) |
| G07B 15/06 | (2011.01) |
| H04N 7/18 | (2006.01) |

(52) U.S. Cl.
CPC ........ *G06V 20/582* (2022.01); *G06F 16/2365* (2019.01); *G06Q 30/0265* (2013.01); *G07B 15/063* (2013.01); *H04N 7/188* (2013.01); *G06V 20/20* (2022.01)

(58) Field of Classification Search
CPC .......... G06F 17/30371; G06Q 30/0265; G06B 15/063; H04N 7/183
See application file for complete search history.

(56) References Cited

U.S. PATENT DOCUMENTS

| | | | |
|---|---|---|---|
| 5,682,030 A | 10/1997 | Kubon | |
| 6,574,603 B1 * | 6/2003 | Dickson | G07C 5/0858 235/381 |
| 8,174,374 B2 | 5/2012 | Yim et al. | |
| 9,069,653 B2 | 6/2015 | Be et al. | |
| 9,146,898 B2 | 9/2015 | Ihlenburg et al. | |

(Continued)

FOREIGN PATENT DOCUMENTS

| | | |
|---|---|---|
| CN | 1329712 C | 8/2007 |
| EP | 982699 A2 | 3/2000 |
| WO | 2015172770 A1 | 11/2015 |

OTHER PUBLICATIONS

Olaverri-Monreal, "Human Factors in the Design of Human-Machine Interaction: An Overview Emphasizing V2X Communication" (published in IEEE Transactions on Intelligent Vehicles, vol. 1, Issue 4, pp. 302-313, 2016) (Year: 2016).*

*Primary Examiner* — Resha Desai
*Assistant Examiner* — Patrick Kim
(74) *Attorney, Agent, or Firm* — Dinsmore & Shohl LLP (57) ABSTRACT

Systems and methods for providing updatable roadway codes are described. One embodiment of a method includes locating a roadway code along a roadway and determining stored data provided by the roadway code. Some embodiments include providing at least a portion of the stored data to the user and capturing environmental data along the roadway, where the environmental data corresponds with the stored data. Still some embodiments include comparing the stored data with the environmental data to determine whether the stored data is accurate and in response to determining that the stored data is not accurate, providing a communication to update the stored data.

19 Claims, 7 Drawing Sheets

(56) References Cited

U.S. PATENT DOCUMENTS

| | | |
|---|---|---|
| 9,177,476 B2 | 11/2015 | Breed |
| 9,262,775 B2 | 2/2016 | Lamont |
| 2013/0293582 A1* | 11/2013 | Ng-Thow-Hing .... G06T 19/006 |
| | | 345/633 |
| 2015/0082410 A1 | 3/2015 | Fitzgerald et al. |
| 2015/0220991 A1 | 8/2015 | Butts et al. |
| 2016/0275329 A1 | 9/2016 | Gussen et al. |
| 2016/0327404 A1 | 11/2016 | Israelsson et al. |
| 2017/0228788 A1* | 8/2017 | Rider ................. G06Q 30/0265 |
| 2018/0023961 A1* | 1/2018 | Fridman ................. H04N 7/18 |
| | | 382/104 |
| 2018/0174449 A1* | 6/2018 | Nguyen ............... G08G 1/0145 |

\* cited by examiner

SYSTEMS AND METHODS FOR PROVIDING UPDATABLE ROADWAY CODES

TECHNICAL FIELD

Embodiments described herein generally relate to systems and methods for providing updatable roadway codes and, more specifically, to roadway codes that provide a pointer to a remote computing device to provide environmental information.

BACKGROUND

As a background, while current positioning systems may provide data related to a route or environment, this information is often static. Additionally, current positioning systems often only provide data related to the route, with little additional information regarding the environment being provided. These current solutions often lack the ability to change, as well as provide other features drivers often demand.

SUMMARY

Systems and methods for providing updatable roadway codes are described. One embodiment of a method includes locating a roadway code along a roadway and determining stored data provided by the roadway code. Some embodiments include providing at least a portion of the stored data to the user and capturing environmental data along the roadway, where the environmental data corresponds with the stored data. Still some embodiments include comparing the stored data with the environmental data to determine whether the stored data is accurate and in response to determining that the stored data is not accurate, providing a communication to update the stored data.

In another embodiment, a system for providing updatable roadway codes includes an image capture device for capturing a roadway code with a static portion and a dynamic portion and a computing device that is coupled to the image capture device. The computing device may include a memory component that stores logic that, when executed by a processor, causes the system to locate the roadway code, determine static data related to the static portion of the roadway code, and communicate with a remote computing device to determine dynamic data related to the dynamic portion of the roadway code. In some embodiments, the logic further causes the system to provide the static data and/or the dynamic data to the user and capture environmental data, where the environmental data corresponds with the dynamic data. In some embodiments, the logic causes the system to compare the dynamic data with the environmental data to determine whether the stored data is accurate and in response to determining that the dynamic data is not accurate, provide a communication to update the dynamic data.

In yet another embodiment, a system includes an image capture device for capturing a roadway code, where the roadway code includes a dynamic portion. The system may also include a remote computing device that stores the dynamic portion of the roadway code and a computing device that is coupled to the image capture device and the remote computing device. The computing device may include a memory component that stores logic that, when executed by a processor, causes the system to locate the roadway code, communicate with the remote computing device to determine dynamic data related to the dynamic portion of the roadway code, and provide at least a portion of the dynamic data to a user. In some embodiments, the logic causes the system to capture environmental data along the roadway, where the environmental data corresponds with the dynamic data, compare the dynamic data with the environmental data to determine whether the stored data is accurate, and in response to determining that the dynamic data is not accurate, provide a communication to update the dynamic data.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing updatable roadway codes. Some embodiments include a lookup table that is remotely stored in the cloud at a remote computing device. The lookup table can include a series of codes that correspond to semantic information for an environment. As the vehicle drives along a roadway, the vehicle may detect a code along the road. The code may be painted using, for example, invisible paint or may be provided via a radio frequency identifier technology, etc. The vehicle may decode the detected roadway code and will look up corresponding information for the code from the lookup table. The corresponding information may include, for example, map data for the local area. This map data can include fixed information such as the location of stop signs, intersections, etc. Additionally, the map data can also include other semantic information, such as broken traffic lights, downed power lines, trees, construction, etc.

In one example, the code can include both a dynamic portion (e.g., a reference number or tag for the lookup table) that refers to dynamic data, as well as a static portion with static data about the location where the vehicle is currently located (such as encoded location information). In this example, the vehicle can both access the updatable dynamic data stored in the lookup table and it can also decode the code and determine the encoded static. The vehicle will thus be able to make decisions even if the vehicle cannot access the lookup table.

Additionally, as the environment changes and a plurality of vehicles detect deviation from the dynamic data, the vehicles can push their detected data. This data can be used to update the information in the lookup table. For example, several vehicles can transmit their sensor data to the remote computing device when they detect deviations from what was stored in the lookup tables. After several vehicles detect deviations, the lookup table can be updated to reflect changes in the environment. The systems and methods for providing updatable roadway codes incorporating the same will be described in more detail, below.

Figure 1:
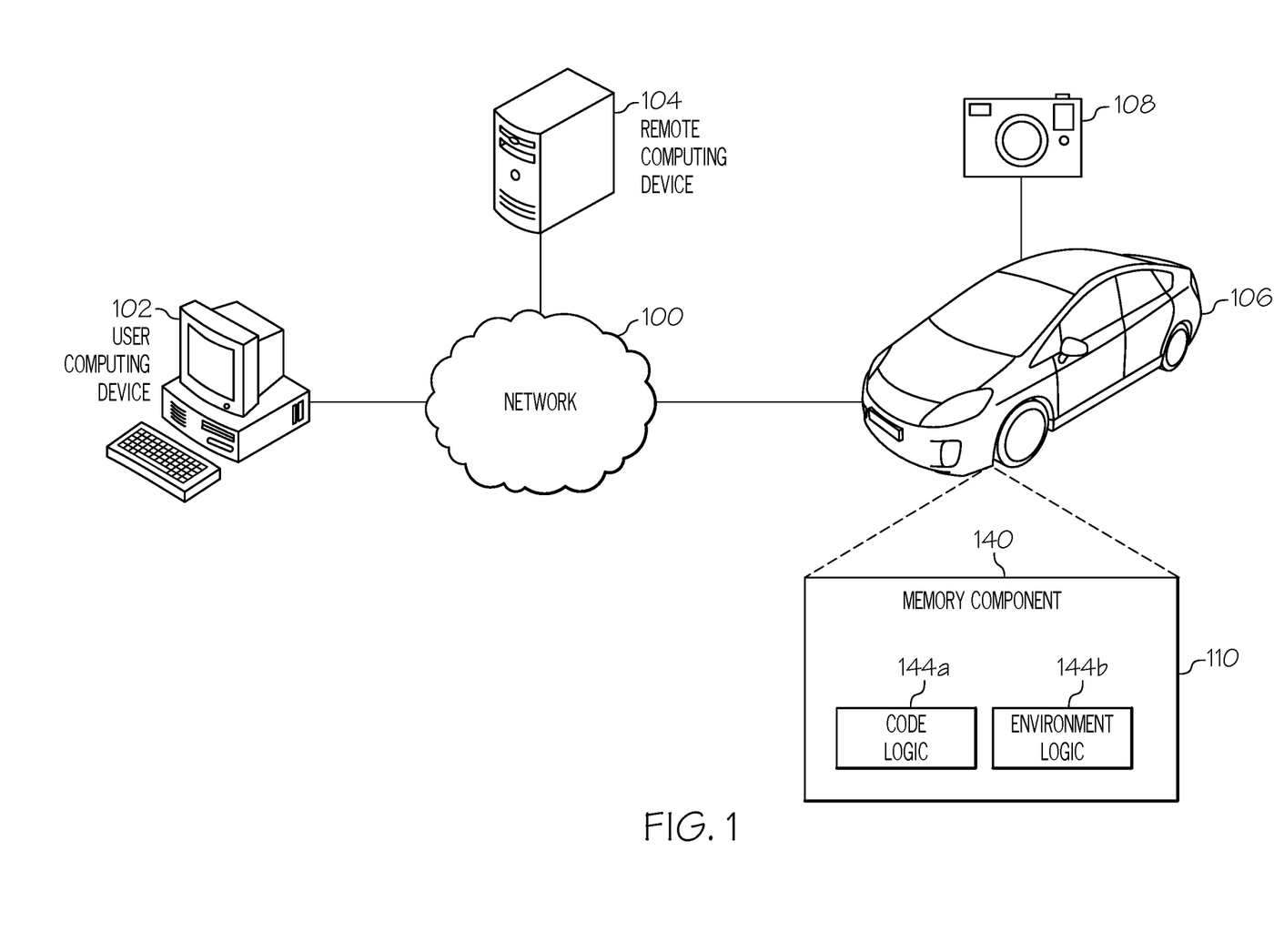
FIG. 1 depicts a computing environment for providing updatable roadway codes, according to embodiments described herein.

Referring now to the drawings, FIG. 1 depicts a computing environment for providing updatable roadway codes, according to embodiments described herein. As illustrated, a network 100 may be coupled to a user computing device 102 and a remote computing device 104. A vehicle 106 may also be included with an image capture device 108 and a vehicle computing device 110, each of which may also be coupled to the network 100. The network 100 may include a wide area network (such as the internet, a public switch telephone network, a power network, a cellular network; a local network (such as an Wi-Fi network, a Bluetooth network, a ZigBee network, a near field network, etc.); and/or any other communication medium for facilitating communication between two or more devices, such as the devices depicted in FIG. 1.

The user computing device 102 may include a personal computer, a laptop, a tablet, a mobile phone, and/or other desktop or mobile device. The user computing device 102 may be configured to receive user input and/or other forms of data to specify display options of the vehicle computing device 110, and/or provide other options for the vehicle 106. Similarly, the user computing device may be operated by a retail establishment, a roadway toll, and/or other entity for communicating with the vehicle computing device 106, and/or the remote computing device 104, as described herein.

The remote computing device 104 may also be coupled to the network 100 and may be configured to store data related to one or more roadway codes, such as a lookup table. As described in more detail below, the roadway codes may include a static portion and/or a dynamic portion. The static portion of the roadway code may be deciphered immediately by the vehicle computing device 110 to reveal static data. The dynamic portion of the roadway code may include a pointer to the remote computing device 104 to access dynamic data. The remote computing device 104 may include a lookup table or other data storage mechanism that correlates the pointer from the roadway code to the dynamic data to which the pointer points. Because the dynamic portion of the roadway code is remotely stored at the remote computing device 104, this portion of the roadway code may be updatable, based on changing conditions of the environment.

It should be understood that the roadway code may be formatted in any of several different ways. As an example, the static portion and/or the dynamic portion may be formatted as a bar code, quick response (QR) code, or other code for accessing the associated data. Similarly, some roadway codes may include the static portion alone, the dynamic portion alone, or the static portion and dynamic portion as part of the same roadway code.

The vehicle 106 may include any terrestrial, airborne, or aquatic vehicle, such as an automobile, truck, boat, airplane, etc. that might encounter roadway codes. While reference is made herein to roadway codes, it will be understood that the roadway codes are not limited to being located on or by a roadway, just that the roadway codes are in areas where the image capture device 108 may encounter the roadway codes. As an example, one embodiment may include a computing device and the image capture device 108 are not coupled to a vehicle 106. In these embodiments, the computing device and image capture device 108 may be located with the user (such as on a mobile phone, on a piece of clothing, etc.) such that when the user walks, roadway codes may be recognized and the corresponding data provided to the user. As such, references to the vehicle computing device 110 for these embodiments will be understood to not require a vehicle per se, as the vehicle computing device 110 may be embodied as a mobile device carried by the user.

The vehicle computing device 110 may include a memory component 140, which may store code logic 144a and environmental logic 144b. As such, the code logic 144a may cause the vehicle computing device 110 to facilitate the recognition of roadway codes, as well as the determination of data associated with the roadway codes and providing this data to the user. As described in more detail below, the vehicle computing device 110 may receive image data and/or other data from the image capture device 108. The vehicle computing device 110 may utilize this data to determine the static portion of the roadway code and contact the remote computing device 104 for the dynamic data corresponding to the dynamic portion of the roadway code. The environmental logic 144b may cause the vehicle computing device 110 to recognize features of the environment and compare these features with the dynamic data from the roadway codes to determine whether the roadway codes are accurate.

It should be noted that while the image capture device 108 is depicted in FIG. 1 as being physically coupled to the vehicle 106, this is just an example. Depending on the embodiment, the image capture device 108 may be located anywhere, so long as positioned to capture the roadway codes described herein. Additionally, while the image capture device 108 may be configured as a still image and/or video camera, this is just an example. Depending on the particular embodiment, the image capture device 108 may be configured as an infrared camera, radio frequency identification device, and/or other device capable of detecting the roadway code, whether the roadway code is visible or invisible to a human.

Figure 2:
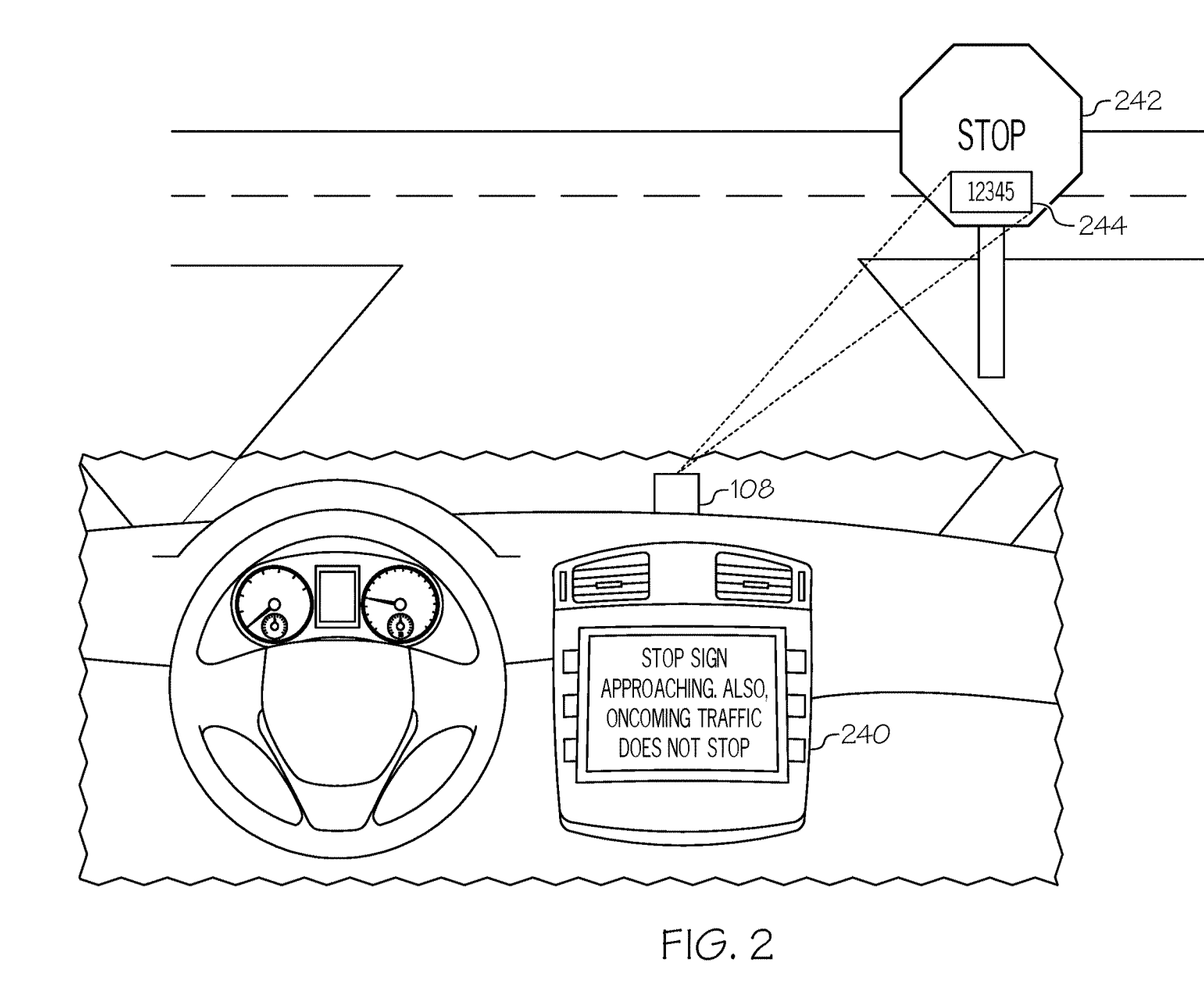
FIG. 2 depicts a dashboard view of a vehicle that recognizes a roadway code, according to embodiments described herein.

FIG. 2 depicts a dashboard view of a vehicle 106 that recognizes a roadway code, according to embodiments described herein. As illustrated, the vehicle 106 may include a display device 240, which may provide one or more visual and/or audio interfaces to the user. The display device 240 may be part of a navigation system, infotainment system, and/or may be part of a mobile device that is carried by the user. Regardless, the display device 240 may be communicatively coupled to the image capture device 108, as well as the vehicle computing device 110.

As illustrated in FIG. 2, the image capture device 108 may detect environmental features, such as road sign 242, the roadway code 244, road conditions, weather conditions, terrain conditions, and the like. As discussed above, the roadway code 244 may be invisible or visible to a human and may include a static portion and/or a dynamic portion. In the example of FIG. 2, the image capture device 108 detects both the road sign 242 and the roadway code 244.

The static portion of the roadway code 244 may be detected by the vehicle computing device 110. In FIG. 2, the static portion indicates that the road sign 242 is a stop sign.

The vehicle computing device 110 may also detect the dynamic portion of the roadway code 244 and may communicate with the remote computing device 104 to determine the data being conveyed by the dynamic portion of the roadway code 244. In this example, the dynamic portion of the roadway code 244 indicates that the traffic at the incoming intersection does not stop. The data from the static portion and dynamic portion of the roadway code may be provided by the display device 240.

It should be understood that while the roadway code 244 may be placed on the road sign 242, this is just one embodiment. As an example, the roadway code 244 may be placed on the road or at another location (such as a predetermined distance prior to the road sign 242), such that if the road sign 242 were to be damaged, stolen, or blocked by an obstruction, the roadway code 244 would still be detected.

Figure 3:
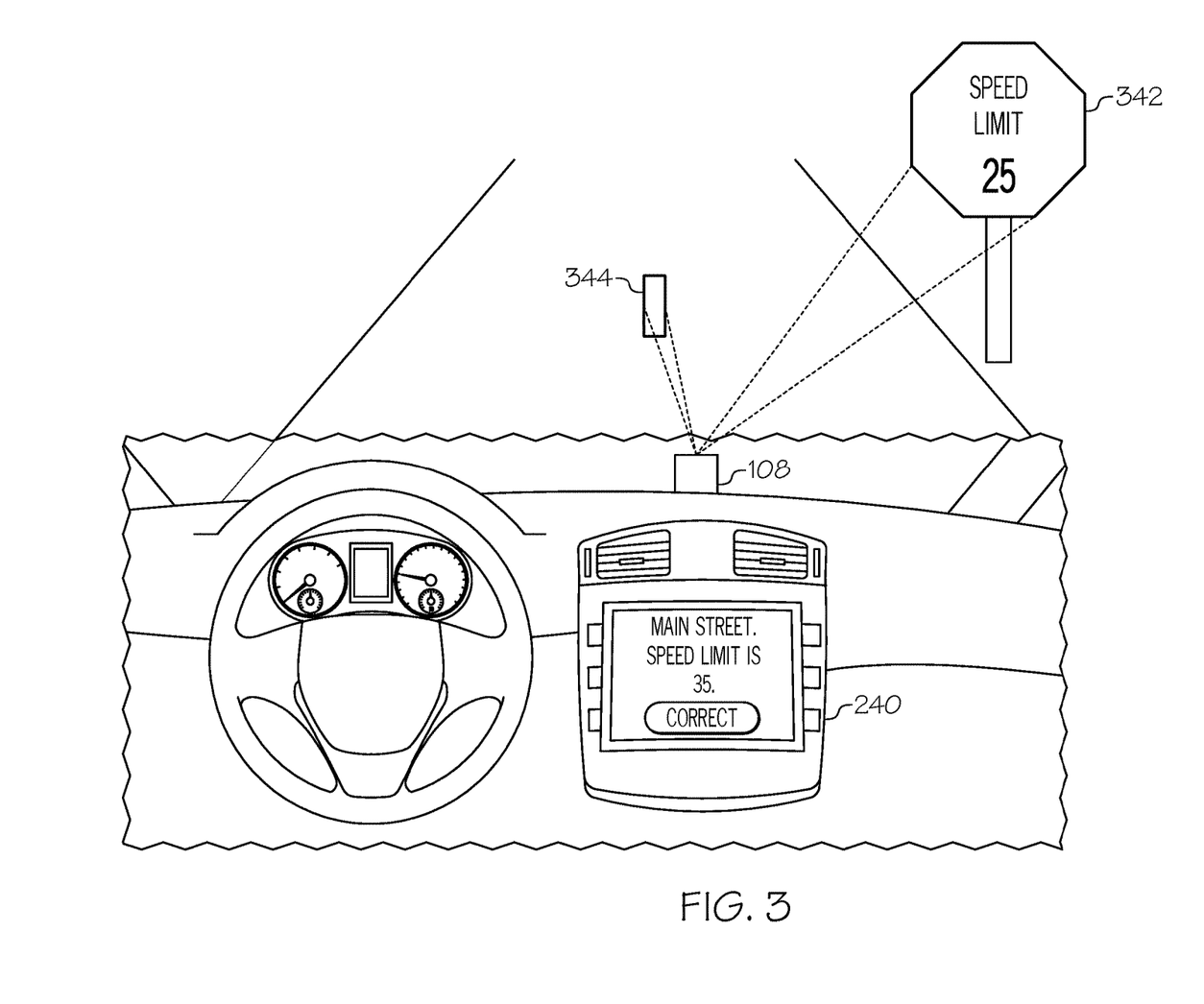
FIG. 3 depicts a dashboard view of a vehicle that determines that a roadway code is different than an environmental condition, according to embodiments described herein.

FIG. 3 depicts a dashboard view of a vehicle 106 that determines that a roadway code 344 is different than an environmental condition, according to embodiments described herein. As illustrated, the road sign 342 indicates that the speed limit is 25 miles per hour. However, the roadway code 344 indicates includes a static portion that indicates that the vehicle 106 is traveling on Main Street, as well as a dynamic portion that indicates that the speed limit is 35 miles per hour. As is evident, the dynamic portion of the roadway code 344 provides different information than the environmental data provided by the road sign 342. As such, the vehicle computing device 110 may determine the discrepancy and may provide an option 346 on the display device 240 to report the discrepancy. Depending on the embodiment, in response to receiving a user selection of the option, the vehicle computing device 110 may send the request to the remote computing device 104. The remote computing device 104 may make the requested change immediately; may make the change once a predetermined number of users make a common request; the change is flagged for further investigation, etc. In some embodiments, the request may be sent automatically by the vehicle computing device 110 without user interaction.

It should be understood that while the embodiments of FIGS. 2 and 3 depict the roadway code 344 as being co-located with the environmental feature to which the roadway code refers, this is merely an example. Some embodiments may be configured such that the roadway code 344 is located a predetermined distance before the environmental feature to which the roadway code 344 refers. As an example, a roadway code 344 may indicate that an upcoming stoplight is out of commission, such that the user has time to properly prepare.

In another example, the roadway code may indicate that a high volume of traffic has passed the roadway code and that an alternate route may be desired. Specifically, as vehicles pass the roadway code, the respective vehicle computing devices may communicate with the remote computing device 104. The remote computing device 104 may calculate a volume of traffic that passed the roadway code (and/or other roadway codes). Thus, the dynamic portion of the roadway code may also provide traffic based information regarding vehicles that have recently passed the roadway code and communicated with the remote computing device 104.

Figure 4:
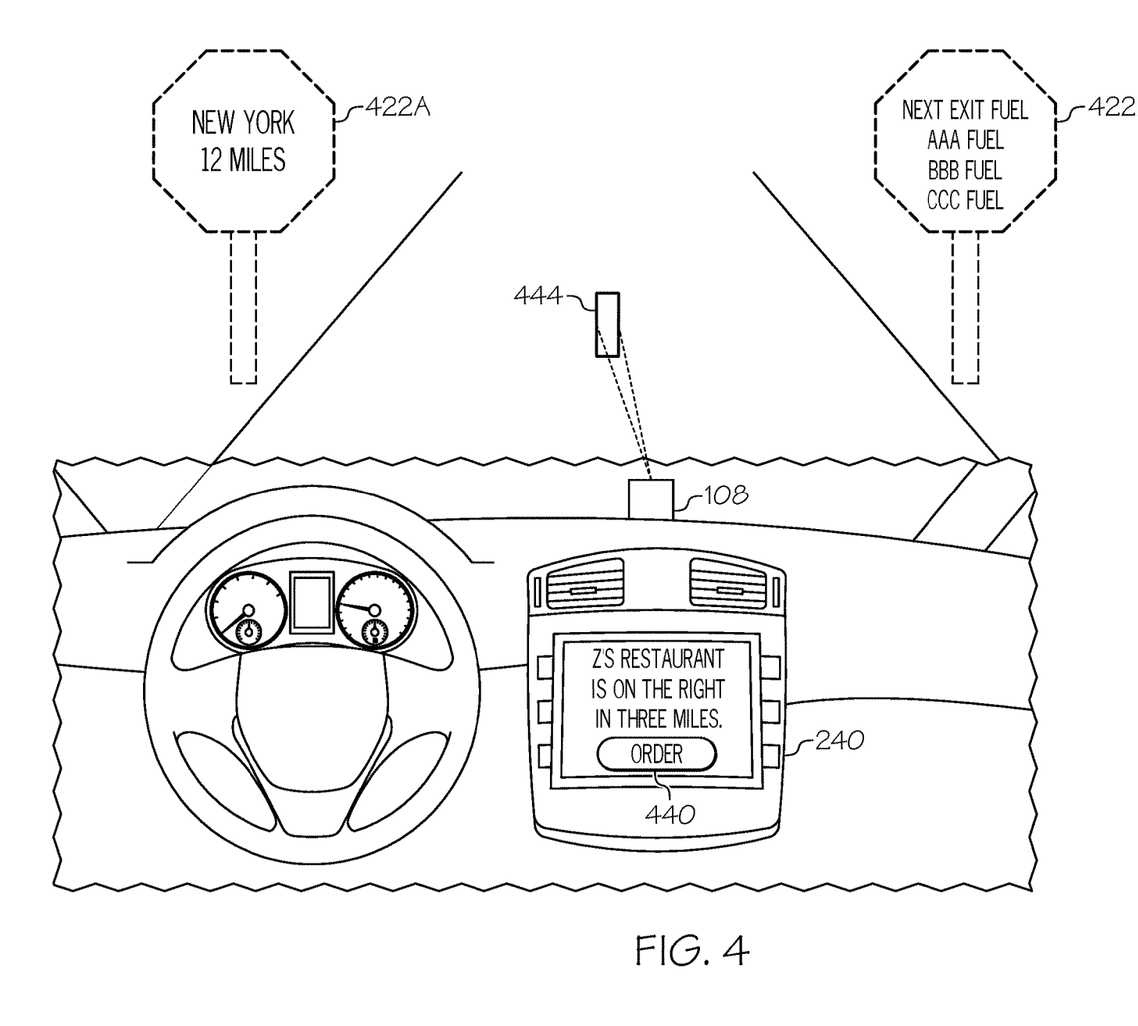
FIG. 4 depicts a dashboard view of a vehicle that provides augmented reality roadway features, according to embodiments described herein.

FIG. 4 depicts a dashboard view of a vehicle 106 that provides augmented reality display of roadway features, according to embodiments described herein. As illustrated, the roadway code 444 may provide information that reduces the need for roadway signs. In the example of FIG. 4, the roadway code 444 may provide several pieces of information via the static portion of the roadway code 444 and/or the dynamic portion of the roadway code 444. The roadway code 444 may provide a distance to a destination, as well as fuel providers at the next exit. As such, the vehicle computing device 110 may provide an augmented reality display of virtual road signs 442a, 442b to provide this information. The virtual road signs 442a, 442b may be placed at a static position to represent where physical road signs would be placed. However, some embodiments may dynamically provide the information such that the user may view the information regardless other environmental features in the area.

Also provided by the roadway code 444 is an advertisement to a particular retail establishment. Specifically, the retail establishment may contract with the service provided by the remote computing device 104 such that preferential advertisement space is provided when the vehicle 106 detects the roadway code. Additionally, an option 440 may be provided for the user to make an order with the retail establishment. By a user selection of the option 440, the user may place an order, which the remote computing device 104 sends to the retail establishment. The remote computing device 104 may send additional information, such as type of vehicle, user name, payment information, order information, expected time of arrival (which may be updated, based on subsequent communications via a second roadway code and/or other roadway codes), etc. to facilitate a purchase.

It should be understood that while the roadway code 444, as well as other roadway codes described herein appear to cause the vehicle computing device 110 to immediately provide the static data and dynamic data, this is just one example. In some embodiments, the roadway code may provide a location for the vehicle computing device 110 to provide information to a user. Referring to the example of FIG. 4, the roadway code 444 may indicate that the virtual road sign 442a is provided when the vehicle 106 is at a first vehicle position and the virtual road sign 442b is provided when the vehicle 106 is at a second vehicle position. The roadway code 444 may additionally indicate how the data is provided to the user (e.g., as a virtual road sign, as a visual display on the display device 240, etc.). Similarly, the roadway code 444 may provide contingencies for providing the static data and/or the dynamic data. As an example, the roadway code 444 may indicate that if the vehicle 106 turns right at the next intersection, provide the dynamic data.

Figure 5:
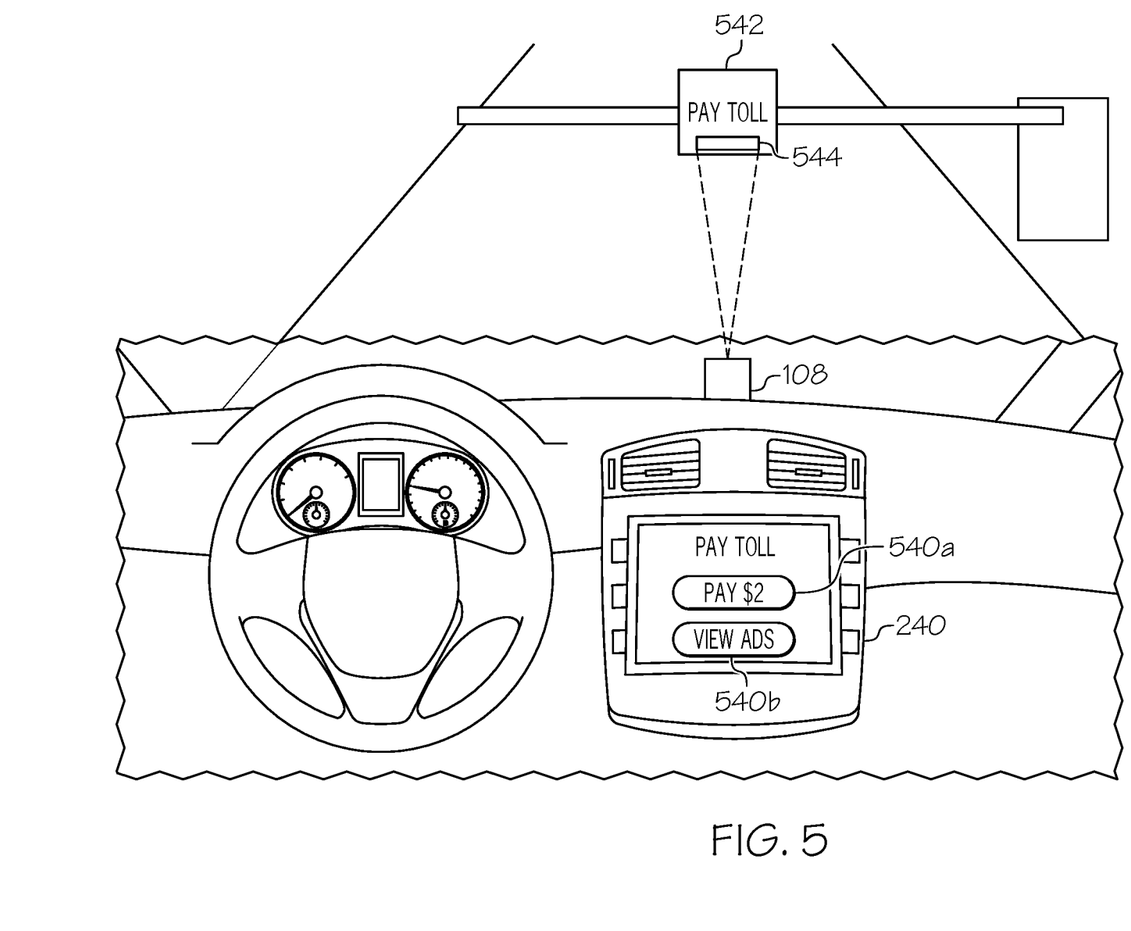
FIG. 5 depicts a dashboard view of a vehicle that provides options for paying a roadway toll, according to embodiments described herein.

FIG. 5 depicts a dashboard view of a vehicle 106 that provides options 540 for paying a toll, such as a roadway toll 542, according to embodiments described herein. As illustrated, when a user approaches a roadway toll 542, the vehicle computing device 110 may detect a roadway code 544. The roadway code 544 may provide information related to the roadway toll 542, as well as an option 540a to pay the roadway toll 542 via the remote computing device 104. Additionally, another option 540b may be provided that allows the user to view an advertisement instead of paying the roadway toll 542. As such, the service provides the remote computing device 104 may contract with one or more advertisers, who pay for advertising space in lieu of drivers paying the roadway toll 542 directly.

It should be understood that while the roadway code 444 is provided in FIG. 5 on the roadway toll 542, this is just an example. Some embodiments may be configured such that the roadway code 544 is provided a predetermined distance before the toll, such that the user may pay the roadway toll 542 or select the option 540b and not have to slow down at the toll 542. Thus, the remote computing device 104 may communicate information related to the vehicle 106 to the roadway toll 542 and direct the vehicle 106 to the appropriate lane to more quickly pass the roadway toll 542.

Figure 6:
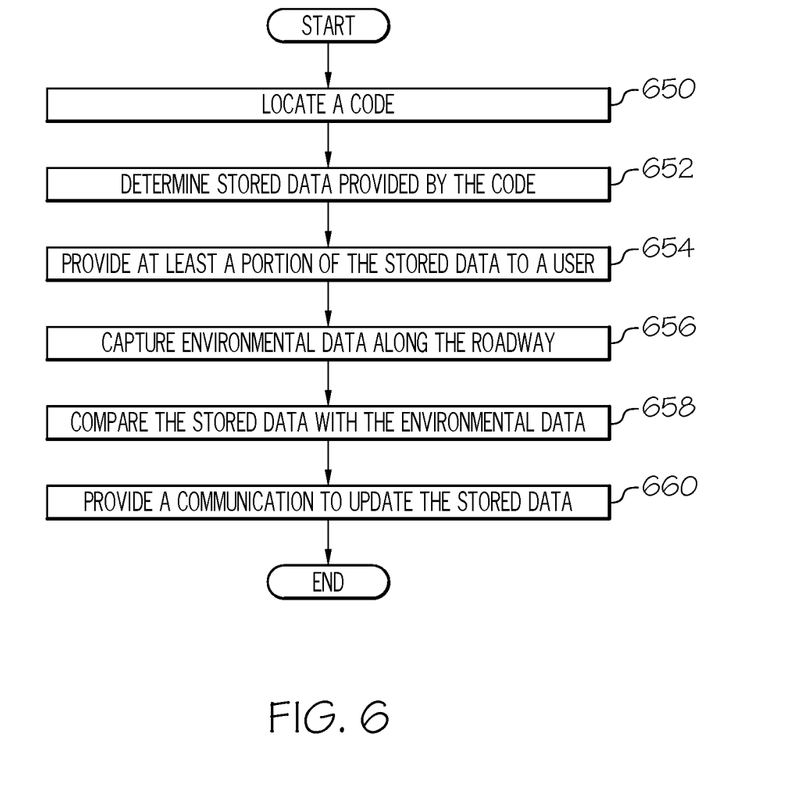
FIG. 6 depicts a flowchart for providing updatable roadway codes, according to embodiments described herein.

FIG. 6 depicts a flowchart for providing updatable roadway codes, according to embodiments described herein. As illustrated in block 650, a roadway code may be located, where the roadway code is invisible to a human. In block 652, stored data provided by the roadway code may be determined. This may include accessing data stored by a remote computing device 104. In block 654, at least a portion of the stored data may be provided to a user. In block 656, environmental data may be captured along the roadway, where the environmental data is associated with the stored data. In block 658, the stored data may be compared with the environmental data to determine whether the stored data is accurate. In block 660, in response to determining that the stored data is not accurate, a communication may be provided to update the stored data.

Figure 7:
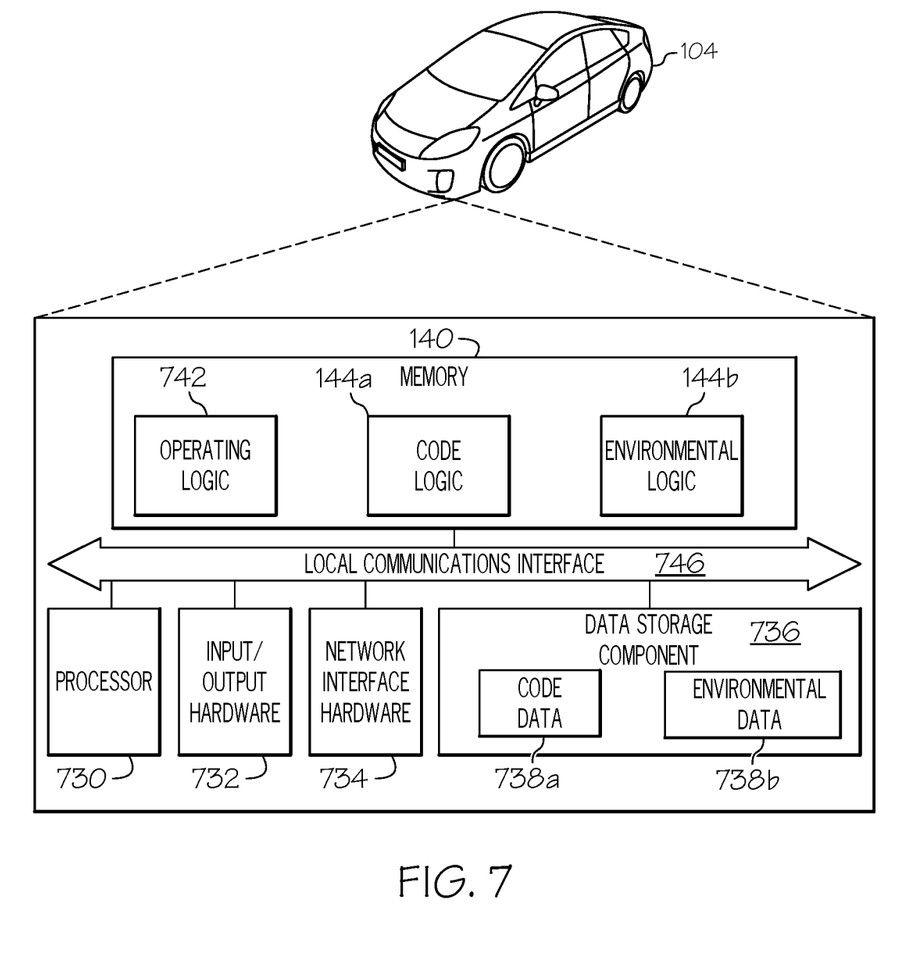
FIG. 7 depicts a vehicle computing device for processing updatable roadway codes, according to embodiments described herein.

FIG. 7 depicts a vehicle computing device 110 for processing updatable roadway codes, according to embodiments described herein. The vehicle computing device 110 includes a processor 730, input/output hardware 732, the network interface hardware 734, a data storage component 736 (which stores code data 738a, environmental data 738b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 110 and/or external to the vehicle computing device 110.

The memory component 140 may store operating logic 742, the code logic 144a and the environmental logic 144b. The code logic 144a and the environmental logic 144b may each include a plurality of different pieces of logic, each of which may be embodied as a computer program, firmware, and/or hardware, as an example. A local communications interface 746 is also included in FIG. 7 and may be implemented as a bus or other communication interface to facilitate communication among the components of the vehicle computing device 110.

The processor 730 may include any processing component operable to receive and execute instructions (such as from a data storage component 736 and/or the memory component 140). As described above, the input/output hardware 732 may include and/or be configured to interface with the sensors, devices, and other components, such as those depicted in FIG. 1.

The network interface hardware 734 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the vehicle computing device 110 and other computing devices, such as a mobile device, a server, etc.

The operating logic 742 may include an operating system and/or other software for managing components of the vehicle computing device 110. As also discussed above, the code logic 144a may reside in the memory component 140 and may be configured to cause the processor 730 to recognize and/or decipher codes, as described above. Similarly, the environmental logic 144b may be utilized to determine aspects of the environment such that a comparison between data in a code and the environment may be made.

It should be understood that while the components in FIG. 7 are illustrated as residing within the vehicle computing device 110, this is merely an example. In some embodiments, one or more of the components may reside external to the vehicle computing device 110. It should also be understood that, while the vehicle computing device 110 is illustrated as a single device, this is also merely an example. In some embodiments, the code logic 144a and/or the environmental logic 144b may reside on different computing devices. As an example, one or more of the functionality and/or components described herein may be provided by a remote computing device and/or mobile device, which may be coupled to the vehicle computing device 110 via a network, such as a local network and/or a wide area network.

Additionally, while the vehicle computing device 110 is illustrated with the code logic 144a and the environmental logic 144b as separate logical components, this is also an example. In some embodiments, a single piece of logic may cause the vehicle computing device 110 to provide the described functionality.

As illustrated above, various embodiments for providing updatable roadway codes are disclosed. These embodiments may provide additional information, options, advertisements, and/or other data to a user driving or riding in a vehicle. This may decrease travel time, provide additional information and purchasing options to a user, as well as make roadway trips more efficient.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for providing updatable roadway codes. It should also be understood that these embodiments are merely exemplary and are not intended to limit the scope of this disclosure.

What is claimed is:

1. A method for providing updatable roadway codes comprising:

locating a roadway code along a roadway, wherein the roadway code is invisible to a user, wherein the roadway code includes a static portion and a dynamic portion;

determining stored data associated with the dynamic portion provided by the roadway code, wherein the stored data associated with the dynamic portion includes an instruction of how the stored data will be presented to the user;

providing at least a portion of the stored data to the user according to the instruction;

capturing environmental data along the roadway, wherein the environmental data corresponds with the stored data;

comparing the stored data with the environmental data to determine whether the stored data is accurate; and in response to determining that the stored data is not accurate, providing a communication to update the stored data.

2. The method of claim 1, wherein the stored data includes an advertisement to be provided to the user.

3. The method of claim 1, wherein providing at least a portion of the stored data to the user comprises providing an augmented reality dashboard display.

4. The method of claim 1, wherein the roadway code identifies a toll and wherein the method further comprises providing at least one of the following: an option to pay the toll and an option to view an advertisement instead of paying the toll.

5. The method of claim 1, further comprising providing an option to make a purchase from a retail establishment.

6. The method of claim 5, in response to receiving a user selection of the option, sending at least one of the following to facilitate the purchase: data related to the vehicle, data related to the user, payment information, expected time of arrival, and order information.

7. A system for providing updatable roadway codes comprising:

an image capture device for capturing a roadway code for a roadway, wherein the roadway code includes a static portion and a dynamic portion; and a computing device that is coupled to the image capture device and includes a memory component that stores logic that, when executed by a processor, causes the system to perform at least the following:

locate the roadway code;

determine static data related to the static portion of the roadway code;

communicate with a remote computing device to determine dynamic data related to the dynamic portion of the roadway code, wherein the remote computing device calculates a number of vehicles that have passed the roadway code and wherein the dynamic data sent to the computing device includes an indication of traffic along the roadway and a recommendation for an alternate; route and wherein the dynamic portion of the roadway code includes an instruction of how the stored data will be presented to the user;

provide the static data and the dynamic data to a user according to the instruction;

capture environmental data, wherein the environmental data corresponds with the dynamic data;

compare the dynamic data with the environmental data to determine whether the dynamic data is accurate; and in response to determining that the dynamic data is not accurate, provide a communication to update the dynamic data.

8. The system of claim 7, wherein the dynamic data includes an advertisement to be provided to the user.

9. The system of claim 7, wherein providing at least a portion of the stored data to the user comprises providing an augmented reality display.

10. The system of claim 7, wherein the roadway code identifies a toll and wherein the logic further causes the system to provide at least one of the following: an option to pay the toll and an option to view an advertisement instead of paying the toll.

11. The system of claim 7, further comprising a display device, wherein the logic further causes the display device to provide an option to make a purchase from a retail establishment.

12. The system of claim 11, wherein in response to receiving a user selection of the option, the logic causes the system to send at least one of the following to facilitate the purchase: data related to the vehicle, data related to the user, payment information, expected time of arrival, and order information.

13. The system of claim 7, wherein the computing device detects a second roadway code, which is utilized to determine a route of the user.

14. A system for providing updatable roadway codes comprising:

an image capture device for capturing a roadway code for a roadway, wherein the roadway code includes a static portion and a dynamic portion;

a remote computing device that stores the dynamic portion of the roadway code; and a computing device that is coupled to the image capture device and the remote computing device and includes a memory component that stores logic that, when executed by a processor, causes the system to perform at least the following:

locate the roadway code;

communicate with the remote computing device to determine dynamic data related to the dynamic portion of the roadway code, wherein the dynamic data includes a contingency such that only in response to the user taking a first action, at least a portion of the static data or at least a portion of the dynamic data is provided to the user, wherein the remote computing device calculates a number of vehicles that have passed the roadway code and wherein the dynamic data sent to the computing device includes an indication of traffic along the roadway and a recommendation for an alternate route;

in response to determining that the user takes a first action, activate the contingency to provide the at least a portion of at the static data or the at least a portion of the dynamic data;

capture environmental data along the roadway, wherein the environmental data corresponds with the dynamic data;

compare the dynamic data with the environmental data to determine whether the stored data is accurate; and in response to determining that the dynamic data is not accurate, provide a communication to update the dynamic data.

15. The system of claim 14, wherein the dynamic data includes an advertisement to be provided to the user.

16. The system of claim 14, wherein providing at least a portion of the stored data to the user comprises providing an augmented reality display.

17. The system of claim 14, wherein the roadway code identifies a toll and wherein the logic further causes the system to provide at least one of the following: an option to pay the toll and an option to view an advertisement instead of paying the toll.

18. The system of claim 14, further comprising a display device, wherein the logic further causes the display device to provide an option to make a purchase from a retail establishment.

19. The system of claim 18, wherein in response to receiving a user selection of the option, the logic causes the system to send at least one of the following to facilitate the purchase: data related to the vehicle, data related to the user, payment information, expected time of arrival, and order information.

\* \* \* \* \*